United States Patent [19]
Schumann et al.

[11] Patent Number: 6,044,862
[45] Date of Patent: Apr. 4, 2000

[54] COMPRESSOR REED VALVE

[75] Inventors: Stanley P. Schumann; Frank Shue Wallis, both of Sidney; Jason Patrick Beresik, Troy; Ernie Roger Bergman, Rossburg; Deborah Louise Monnin, Minster, all of Ohio

[73] Assignee: Copeland Corporation, Sidney, Ohio

[21] Appl. No.: 09/250,887

[22] Filed: Feb. 16, 1999

[51] Int. Cl.$^7$ .................................................. F16K 15/00
[52] U.S. Cl. ..................... 137/512; 137/543.19; 137/856; 137/852
[58] Field of Search .............................. 137/543.19, 512, 137/856, 852, 851, 543.21, 855, 857, 858, 516.29; 417/567, 571; 251/358

[56] References Cited

U.S. PATENT DOCUMENTS

| | | | |
|---|---|---|---|
| 886,045 | 4/1908 | Ehrlich | 137/543.19 |
| 1,834,589 | 12/1931 | Holdsworth | 137/543.19 |
| 1,852,033 | 4/1932 | Summers | 137/857 |
| 2,996,155 | 8/1961 | Priesemuth | 137/858 |
| 4,193,424 | 3/1980 | Hrabal . | |
| 4,368,755 | 1/1983 | King . | |
| 4,445,534 | 5/1984 | King . | |
| 4,469,126 | 9/1984 | Simpson . | |
| 4,470,774 | 9/1984 | Chambers . | |
| 4,478,243 | 10/1984 | King . | |
| 4,543,989 | 10/1985 | Lorson . | |
| 4,548,234 | 10/1985 | Prenger . | |
| 4,642,037 | 2/1987 | Fritchman . | |
| 4,643,139 | 2/1987 | Hargreaves . | |
| 4,696,263 | 9/1987 | Boyesen . | |
| 4,729,402 | 3/1988 | Blass et al. . | |
| 4,875,503 | 10/1989 | Heger et al. . | |
| 5,016,669 | 5/1991 | Jamieson | 137/857 |
| 5,192,200 | 3/1993 | Lilie et al. . | |
| 5,213,125 | 5/1993 | Leu . | |
| 5,277,556 | 1/1994 | van Lintel . | |
| 5,934,305 | 8/1999 | Cho | 137/856 |

*Primary Examiner*—Denise L. Ferensic
*Assistant Examiner*—Joanne Y. Kim
*Attorney, Agent, or Firm*—Harness, Dickey & Pierce, P.L.C.

[57] ABSTRACT

A valve assembly has a discharge valve member and a suction valve member. One of these valve members includes a reed valve. The reed valve has a tab which includes a slot which engages a cantilevered pin. The cantilevered pin allows flexing of the pin upon contact with the reed valve. In addition, the cantilever mounting of the pin provides a lubricant reservoir for lubricating the interface between the pin and the reed valve.

18 Claims, 2 Drawing Sheets

COMPRESSOR REED VALVE

FIELD OF THE INVENTION

The present invention relates generally to pressure responsive valve assemblies. More particularly, the present invention relates to pressure responsive valve assemblies which include reed valves. The valve assemblies are adapted for use in reciprocating piston type compressors, such as refrigerant type compressors.

BACKGROUND AND SUMMARY OF THE INVENTION

Reciprocating piston type compressors typically employ suction and discharge pressure actuated valving mounted at the end of the cylinder housing. When designing these valve assemblies, it is of critical importance to overall system operation to provide a sufficiently large port area to permit the flow of a maximum amount of fluid within a given time period and at an acceptably small pressure drop. This is particularly true for refrigeration compressors employed in air conditioning systems because of the relatively high mass flow rates generally required in such systems.

Associated and conflicting with the desirability to maximize port area of a given size cylinder is the need to reduce the weight of the moving valve member. The reduction of the weight of the moving valve member will lead to a limitation of the inertial effect of the valve and a minimization of the noise level associated with the opening and closing of the valve.

Another important design objective is to minimize the re-expansion or clearance volume of the cylinder. The valving system and the cylinder top end wall should have a shape which is complimentary with the shape of the top of the piston to enable the piston to reduce the volume of the compression chamber to a minimum when the piston is at top dead center of its stroke without restricting gas flow. While it may be possible to accomplish this objective by designing a complex piston head shape, manufacturing of this complex shape becomes excessively expensive, the assembly becomes more difficult and throttling losses generally occur as the piston approaches top dead center. Reduction of the re-expansion volume is of great importance in refrigeration compressors having relatively low mass flow rates, such as those units employed in very low temperature refrigeration systems, as well as in compressors used in heat pump applications.

A typical prior art valve assembly which has been developed to meet the above defined design criteria and solve some of the problems associated with the design of valve assemblies is shown in Applicants' Assignee's U.S. Letters Pat. No. 4,470,774.

The valve assemblies disclosed in the aforesaid Letters Pat. No. 4,470,774 and particularly the suction valve insert in the form of an annular ring have performed satisfactorily in prior art compressor assemblies. These prior art compressor assemblies used a chlorofluorocarbon (CFC) refrigerant or a hydrochlorofluorocarbon (HCFC) refrigerant. The lubricating oil for these CFC and HCFC compressors has been a mineral oil based lubricant. The combination of the CFC or HCFC refrigerant and the mineral oil based lubricant provides sufficient cooling and lubrication for the insert in these prior art compressors. CFC and HCFC refrigerants are being phased out in refrigerant compressors due to the well known problems associated with the earth's ozone layer. One refrigerant which is being utilized to replace the CFC and HCFC refrigerant is a hydrofluorocarbon (HFC) refrigerant.

HFC refrigerants do not have an adverse affect on the earth's ozone layer and they are quickly becoming the choice of refrigerants to replace the CFC and HCFC refrigerants. When using HFC refrigerants, the mineral oil based lubricants lose some of their effectiveness and they need to be replaced with alternate and more effective lubricants. One lubricant which has shown to be compatible with and effective with HFC refrigerants is a Polyol Ester based lubricant. While the Polyol Ester based lubricants have proven to be a suitable replacement for the mineral oil based lubricants when using HFC refrigerants, there has always been the need to improve and extend the durability of the reciprocating piston designs of compressors.

One component which is being continuously improved is the reed valves associated with the discharge and suction valves of the compressor. The present invention provides the art with a reed valve which is positioned using a cantilevered pin. The cantilevered pin significantly improves the durability of the reed valve.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
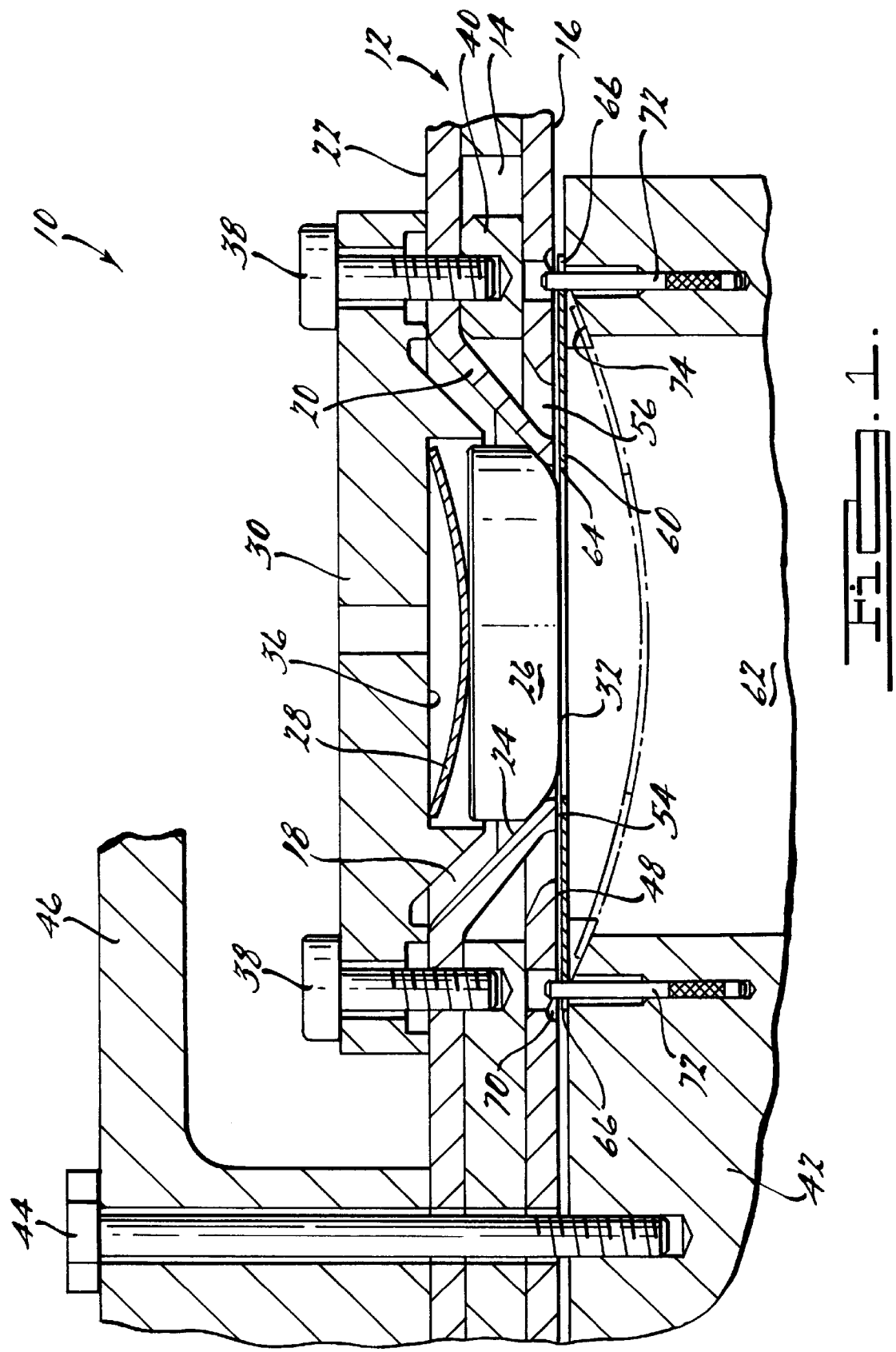
FIG. 1 is a sectional view of a valve assembly incorporating a laser hardened reed valve positioned with a cantilevered pin in accordance with the present invention.
Figure 2:
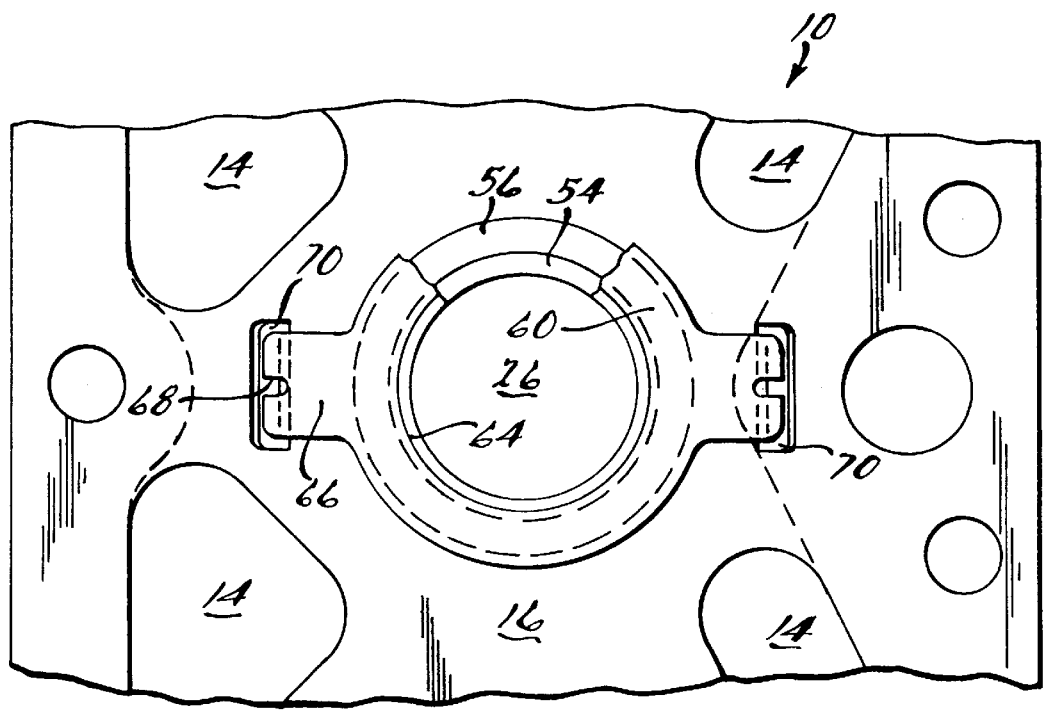
FIG. 2 is a bottom plan view (from inside the cylinder chamber) of the valve assembly showing in FIG. 1.

Referring now to the drawings in which like reference numerals designate like or corresponding parts throughout the several views, there is illustrated in FIGS. 1 and 2, a valve assembly in accordance with the present invention which is indicated generally by the reference numeral 10. Valve assembly 10 comprises a valve plate assembly 12 having a relatively large irregularly shaped generally annular recessed portion or suction chamber 14 extending into the lower surface 16 thereof. A discharge chamber 18 of frusto conical shape is also provided, being defined by a radially inwardly inclined or beveled sidewall 20 extending between an upper surface 22 and lower surface 16 of valve plate assembly 12. A surface 24 of sidewall 20 provides a valve seat for a discharge valve member 26 which is urged in to sealing engagement therewith by gas pressure and a wave spring 28 extending between valve member 26 and a bridge-like retainer 30.

As shown, discharge valve member 26 is of a size and shape relative to discharge chamber 18 so as to place a lower surface 32 thereof in substantially coplanar relationship to lower surface 16 of valve plate 12. Wave spring 28 is located in a recess 36 provided in retainer 30. Discharge valve member 26 is essentially pressure actuated and wave spring 28 is chosen primarily to provide stability and also an initial closing bias or preload to establish an initial seal. Other types of springs, other than wave springs may of course be used for this purpose. Retainer 30, which also serves as a stop to limit the opening movement of valve member 26 is secured to valve plate 12 by a pair of suitable fasteners 38.

A generally annular valve plate insert 40 is disposed within recessed suction chamber 14 into which fasteners 38 extend so as to secure retainer 30. Valve plate assembly 12 is secured to a cylinder housing 42 using a plurality of bolts 44 which extend through a valve cover 46, through valve plate assembly 12 and are threadingly received within cylinder housing 42. A plurality of spaced cutout areas or radially extending slots (not shown) are provided through valve plate insert 40 so as to allow suction fluid flow between radially inner and outer sides thereof.

Valve plate assembly 12 defines an annular valve seat 48 and sidewall 20 defines an annular valve seat 54 at its terminal end. Disposed between valve seat 48 and valve seat 54 is a suction input passage 56.

Valve seat 54 of sidewall 20 is positioned in coplanar relationship with valve seat 48 of valve plate assembly 12. A suction reed valve member 60 in the form of an annular ring sealingly engages, in its closed position, valve seat 54 of sidewall 20 and valve seat 48 of valve plate assembly 12 to prevent passage of fluid from suction chamber 14 through passage 56 and into a compression chamber 62. A central opening 64 is provided in suction reed valve member 60 and is arranged coaxially with discharge chamber 18 so as to allow direct fluid flow communication between compression chamber 62 and lower surface 32 of discharge valve member 26. Suction reed valve member 60 also includes a pair of diametrically opposed radially outwardly extending tabs 66 each of which is provided with a suitable opening or slot 68 extending therethrough. Tabs 66 are received in a notched portion 70 of valve plate assembly 12 and a pair of cantilevered pins 72 extending through openings 68 and into cylinder housing 42 to retain suction reed valve member 60 in operative relationship thereto.

As the reciprocating piston (not shown) disposed within compression chamber 62 moves away from valve assembly 10 during a suction stroke, the pressure differential between compression chamber 62 and suction chamber 14 will cause suction reed valve member 60 to deflect inwardly with respect to compression chamber 62, to its open position, as shown in phantom in FIG. 1, thereby enabling fluid flow from suction chamber 14 into compression chamber 62 through input passage 56 disposed between valve seats 48 and 54. Because only tabs 66 of suction reed valve member 60 extend outwardly beyond the sidewalls of compression chamber 62, suction fluid flow will readily flow into compression chamber 62 around substantially the entire inner and outer peripheries of suction valve member 60. As a compression stroke of the piston begins, suction valve member 60 will be forced into sealing engagement with valve seat 54 and valve seat 48. Discharge valve member 26 will begin to open due to the pressure within compression chamber 62 exceeding the pressure within discharge chamber 18 and the force exerted by spring 28. The compressed gas will be forced through central opening 64, past discharge valve member 26 and into discharge chamber 18. The concentric arrangement of valve plate assembly 12 and reed valve member 60 allow substantially the entire available surface area overlying compression chamber 62 to be utilized for suction and discharge valving and porting, thereby allowing maximum fluid flow both into and out of compression chamber 62.

The continuous stroking of the piston within compression chamber 62 continuously causes suction reed valve member 60 to move between its open and closed positions. Thus, there is a constant bending or flexing of tabs 66. Cylinder housing 42 includes an angled or curved portion 74 at the outer edge of compression chamber 62 to provide a friendly surface for suction reed valve member 60 to bend against, thereby significantly reducing the bending stresses generated within tabs 66.

Figure 3:
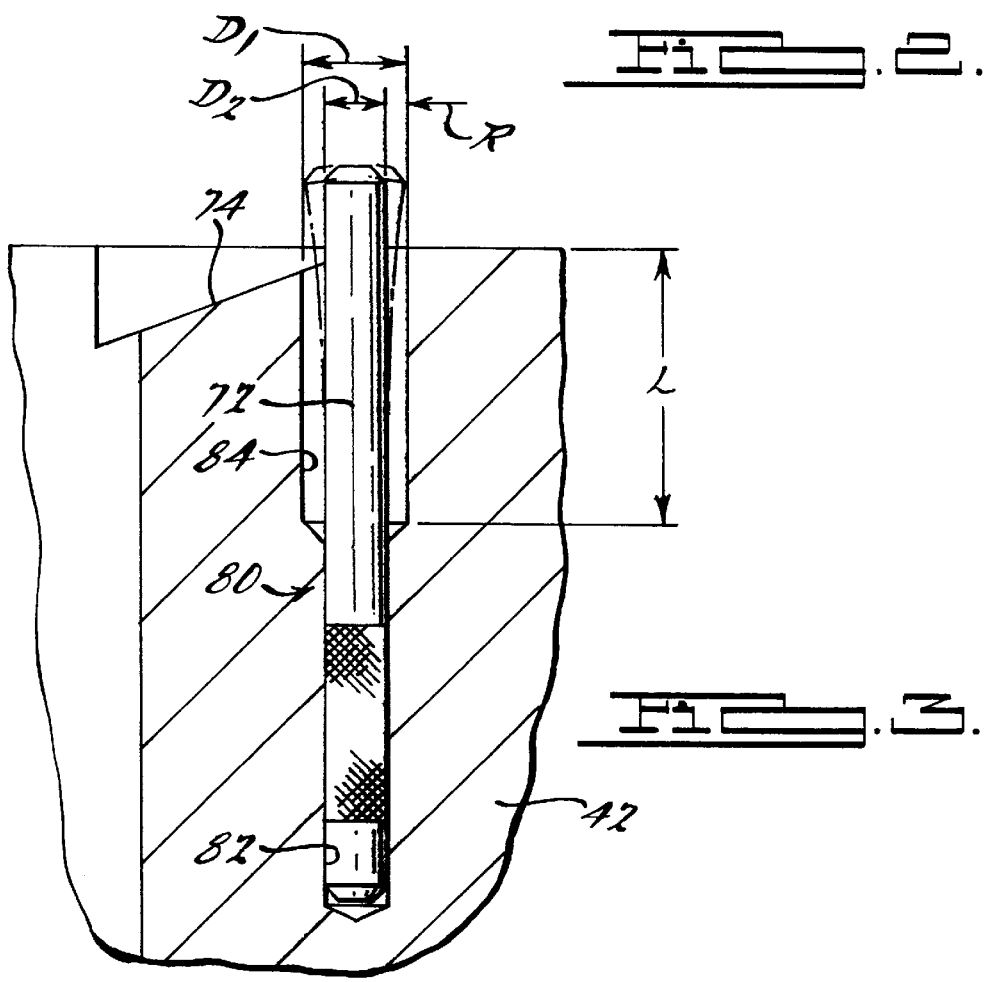
FIG. 3 is an enlarged cross-sectional view of the cantilevered pin shown in FIG. 1.

Referring now to FIG. 3, the present invention is directed to the unique cantilevered pin 72 which is press fit within cylinder housing 42. The constant bending and flexing of tabs 66 of suction reed valve member 60 during the continuous stroking of the piston within compression chamber 62 causes cyclical contact between tabs 66 and pin 72. In order to improve the durability of reed valve member 60, tabs 66 can be hardened at the point of contact with pin 72. While this hardening of tabs 66 improves the durability of reed valve member 60, the durability of reed valve member 60 can be further improved by providing a cantilevered design for pin 72.

Cylinder housing 42 defines a pair of stepped bores 80 (only one shown in FIG. 3) which includes a lower portion 82 and an upper portion 84. The size of lower portion 82 is designed to provide a press fit relationship with pin 72 to locate and retain pin 72 within cylinder housing 42. The size of upper portion 84 is designed to provide clearance to allow the upper portion of pin 72 to deflect as shown in phantom in FIG. 3. By allowing the upper portion of pin 72 to deflect, pin 72 is able to absorb the impact force of the contact with tab 66 thus significantly reducing wear on tab 66. In addition, the larger upper portion 84 of bore 80 and pin 72 defines an annular oil reservoir which will become filled with oil during the operation of the compressor. This oil reservoir provides lubricant to pin 72 which combats abrasive wear between pin 72 and tab 66 and also supplies a squeeze film to again reduce impact wear between tab 66 and pin 72. Preferably, the length L of upper portion 84 of bore 80 in relation to the diameter D, of upper portion 84 would satisfy the relationship of L/D>=1.0 (i.e., the diameter being less than the length). In addition, the radial clearance R between pin 72 and upper portion of bore 80 should the relationship of R>=$D_2$/100 where $D_2$ is the diameter of pin 72.

While the above detailed description describes the preferred embodiment of the present invention, it should be understood that the present invention is susceptible to modification, variation and alteration without deviating from the scope and fair meaning of the subjoined claims.

What is claimed is:

1. A pressure responsive valve assembly for a compression chamber defined by a cylinder housing, said valve assembly comprising:

a valve plate having an inner surface defining a discharge chamber and a suction chamber;

a pressure responsive discharge valve member disposed between said discharge chamber and said compression chamber;

a single piece pressure responsive suction valve member disposed between said suction chamber and said compression chamber, said suction valve member having at least one tab; and a first cantilevered pin received within said cylinder housing and engaged by said tab, said cylinder housing defining a first portion for retaining said first pin and a second portion providing a clearance for said first pin, said second portion being disposed adjacent said suction valve member and first portion.

2. The valve assembly in accordance with claim 1 wherein said suction valve member comprises an annular ring and said at least one tab comprises a pair of diametrically opposed radially outwardly extending tabs.

3. The valve assembly in accordance with claim 1 wherein, said at least one tab defines a slot, said first cantilevered pin being disposed within said slot.

4. The valve assembly in accordance with claim 1 further comprising a second cantilevered pin diametrically opposed to said first cantilevered pin wherein said at least one tab comprises a pair of diametrically opposed tabs, each of said first and second cantilevered pins engaged by a respective tab.

5. The valve assembly in accordance with claim 4 wherein, said cylinder housing defines a third portion for retaining said second pin and a fourth portion for providing clearance for said second pin, said fourth portion being disposed adjacent said suction valve member.

6. The valve assembly in accordance with claim 5 wherein, said second and fourth portions define a lubricant reservoir.

7. The valve assembly in accordance with claim 1 wherein, said second portion defines a lubricant reservoir.

8. The valve assembly in accordance with claim 1 wherein, said second portion defines a length and a diameter, said diameter being less than said length.

9. The valve assembly in accordance with claim 1 wherein, said clearance is equal to or greater than a diameter of said pin divided by 100.

10. A pressure responsive valve assembly for a compression chamber defined by a cylinder housing, said valve assembly comprising:

a valve plate having an inner surface defining a discharge chamber and a suction chamber;

a pressure responsive discharge valve member disposed between said discharge chamber and said compression chamber;

a single piece pressure responsive suction valve member disposed between said suction chamber and said compression chamber, said suction valve member having at least one tab; and a first cantilevered pin received within said cylinder housing and engaged by said tab, said cylinder housing defining a first bore for retaining said first pin and a second bore providing a clearance for said first pin, said second bore being disposed adjacent said suction valve member.

11. The valve assembly in accordance with claim 10 wherein said suction valve member comprises an annular ring and said at least one tab comprises a pair of diametrically opposed radially outwardly extending tabs.

12. The valve assembly in accordance with claim 10 wherein, said at least one tab defines a slot, said first cantilevered pin being disposed within said slot.

13. The valve assembly in accordance with claim 10 further comprising a second cantilevered pin diametrically opposed to said first cantilevered pin wherein said at least one tab comprises a pair of diametrically opposed tabs, each of said first and second cantilevered pins engaged by a respective tab.

14. The valve assembly in accordance with claim 13 wherein, said cylinder housing defines a third bore for retaining said second pin and a fourth bore for providing clearance for said second pin, said fourth bore being disposed adjacent said suction valve member.

15. The valve assembly in accordance with claim 14 wherein, said second and fourth bores define a lubricant reservoir.

16. The valve assembly in accordance with claim 10 wherein, said second bore defines a lubricant reservoir.

17. The valve assembly in accordance with claim 10 wherein, said second portion defines a length and a diameter, said diameter being less than said length.

18. The valve assembly in accordance with claim 10 wherein, said clearance is equal to or greater than a diameter of said pin divided by 100.

* * * * *

UNITED STATES PATENT AND TRADEMARK OFFICE
CERTIFICATE OF CORRECTION

PATENT NO. : 6,044,862
DATED : April 4, 2000
INVENTOR(S) : Stanley P. Schumann et al It is certified that error appears in the above-identified patent and that said Letters Patent is hereby corrected as shown below:

Column 1, line 34, "complimentary" should be -- complementary --.

Column 2, line 32, "showing" should be -- shown --.

Column 4, line 33, "D," should be -- $D_1$ --.

Column 4, line 63, delete "and first portion".

Signed and Sealed this

Third Day of April, 2001

Attest:

NICHOLAS P. GODICI

*Attesting Officer*     *Acting Director of the United States Patent and Trademark Office*